United States Patent
Murakami et al.

(10) Patent No.: US 8,869,056 B2
(45) Date of Patent: Oct. 21, 2014

(54) INFORMATION-PROCESSING DEVICE AND PROGRAM

(75) Inventors: Keiichi Murakami, Tokyo (JP); Naoki Hashida, Tokyo (JP); Dai Kamiya, Tokyo (JP); Yasushi Onda, Tokyo (JP); Izua Kano, Tokyo (JP); Kazuhiro Yamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 119 days.

(21) Appl. No.: 13/062,088

(22) PCT Filed: Sep. 8, 2009

(86) PCT No.: PCT/JP2009/065677
§ 371 (c)(1),
(2), (4) Date: Mar. 3, 2011

(87) PCT Pub. No.: WO2010/027087
PCT Pub. Date: Mar. 11, 2010

(65) Prior Publication Data
US 2011/0167368 A1 Jul. 7, 2011

(30) Foreign Application Priority Data
Sep. 8, 2008 (JP) .................................. 2008-230219

(51) Int. Cl.
*G06F 3/0481* (2013.01)
*G09G 5/14* (2006.01)

(52) U.S. Cl.
CPC ................ *G09G 5/14* (2013.01); *G06F 3/0481* (2013.01); *G09G 2340/0464* (2013.01)
USPC ........... 715/767; 715/800; 715/788; 715/781; 715/866

(58) Field of Classification Search
CPC ........................... G06F 3/0481; G06F 3/04815
USPC ........................................................ 715/767
See application file for complete search history.

(56) References Cited

U.S. PATENT DOCUMENTS 5,841,435 A * 11/1998 Dauerer et al. ............... 715/775
6,239,798 B1 * 5/2001 Ludolph et al. .............. 715/788
(Continued)

FOREIGN PATENT DOCUMENTS

CN 1238617 A 12/1999
JP 02178726 7/1990
(Continued)

OTHER PUBLICATIONS

Microsoft, "Working screenshot of Windows Vista", Released on Jan. 30, 2007, 6 pages.*
(Continued)

*Primary Examiner* — William Bashore
*Assistant Examiner* — Reza Nabi
(74) *Attorney, Agent, or Firm* — MKG, LLC

(57) ABSTRACT

An information-processing device according to the present invention displays plural windows in a certain arrangement. The information-processing device selects one of displayed windows as a selected window, and in response to an operation to specify a direction, sets a window located in the direction as a selected window. The information-processing device also, in a case where plural windows are displayed in a certain arrangement, changes the arrangement in accordance with a predetermined operation. The change may be made in a regular manner or according to a random pattern. For example, in a case where window W1 shown in Fig. (a) is a selected window, a desired window (a window a user wishes to select) is window W5, and arrangement is changed, the arrangement is changed to an arrangement shown in Fig. (b) or (c) so that a number of operations that is required for a user to select the desired window is reduced.

14 Claims, 8 Drawing Sheets

(56) References Cited

U.S. PATENT DOCUMENTS

| | | | | |
|---|---|---|---|---|
| 6,448,987 | B1 * | 9/2002 | Easty et al. | 715/834 |
| 7,036,091 | B1 * | 4/2006 | Nguyen | 715/834 |
| 7,644,373 | B2 * | 1/2010 | Jing et al. | 715/838 |
| 8,209,638 | B2 * | 6/2012 | Hoff et al. | 715/866 |
| 8,214,768 | B2 * | 7/2012 | Boule et al. | 715/863 |
| 8,418,072 | B1 * | 4/2013 | Bauer et al. | 715/764 |
| 2004/0174398 | A1 * | 9/2004 | Luke et al. | 345/856 |
| 2006/0277469 | A1 * | 12/2006 | Chaudhri et al. | 715/709 |
| 2007/0038952 | A1 * | 2/2007 | Reponen et al. | 715/783 |
| 2008/0059893 | A1 * | 3/2008 | Byrne et al. | 715/757 |
| 2008/0178104 | A1 | 7/2008 | Kim | |
| 2009/0089668 | A1 * | 4/2009 | Magnani et al. | 715/273 |
| 2009/0300146 | A1 * | 12/2009 | Park et al. | 709/219 |
| 2010/0088647 | A1 * | 4/2010 | Jing et al. | 715/838 |
| 2010/0162172 | A1 * | 6/2010 | Aroner | 715/838 |
| 2010/0169844 | A1 * | 7/2010 | Hoff et al. | 715/866 |
| 2010/0333029 | A1 * | 12/2010 | Smith et al. | 715/834 |
| 2011/0038550 | A1 * | 2/2011 | Obrador | 382/225 |
| 2011/0148933 | A1 * | 6/2011 | Murakami et al. | 345/660 |
| 2011/0161873 | A1 * | 6/2011 | Murakami et al. | 715/800 |
| 2011/0167389 | A1 * | 7/2011 | Murakami et al. | 715/835 |
| 2011/0173553 | A1 * | 7/2011 | Karmon et al. | 715/767 |
| 2011/0246917 | A1 * | 10/2011 | Murakami et al. | 715/765 |
| 2011/0264657 | A1 * | 10/2011 | Hoffman et al. | 707/728 |

FOREIGN PATENT DOCUMENTS

| | | | |
|---|---|---|---|
| JP | 08030423 | | 2/1996 |
| JP | 2003186593 | | 7/2003 |
| JP | 2005-167712 | * | 6/2005 |
| JP | 2005167712 | | 6/2005 |

OTHER PUBLICATIONS

European Office Action for EP Patent Application No. 09 811 610.6-1228 dated Jan. 26, 2012.
Japanese Patent Application No. 2008-230219; Japanese Office Action dated Oct. 11, 2011.
European Patent Application No. 09811610.6; Supplementary EP Search Report dated Feb. 12, 2011.
First Notification of Office Action issued in Chinese Patent Application No. 200980134796.7 issued on Dec. 4, 2012.
Office Action from corresponding Chinese Application No. 200980134796.7, dated Aug. 7, 2013.
Office Action for corresponding Chinese patent application No. CN200980134796.7, dated Feb. 20, 2014.
Communication pursuant to Article 94(3) EPC issued in corresponding European Patent Application No. 09811610.6-1903, dated Aug. 5, 2014.

* cited by examiner

INFORMATION-PROCESSING DEVICE AND PROGRAM

TECHNICAL FIELD

The present invention relates to a GUI (Graphical User Interface).

BACKGROUND

A multi-window system, in which plural windows can be displayed, is known. In a case where such a multi-window system is applied to an electronic device such as a mobile phone, an operation to select a window can be inconvenient. For example, in an electronic device that does not have a pointing device such as a mouse for selecting a position (coordinate), an operation to select a desired window is likely to be inconvenient if the number of windows displayed increases.

As a technique for improving operability in the multi-window system, a technique described in JP 2-178726 A and JP 8-30423 A (see paragraphs 0096-0100) is known. By the technique described in JP 2-178726 A and JP 8-30423 A display positions of one window and another window are switched. However, the technique of switching display positions requires that plural windows whose display position is to be switched be specified; therefore, the technique is not suitable for an electronic device not having a pointing device. The same is true in a situation in which a desired window is selected from a displayed list.

SUMMARY

In view of the above problems, it is the object of the present invention to enable a user easily to select a desired window, without using a special pointing device such as a mouse, when plural windows can be displayed.

In one aspect, an information-processing device according to the present invention includes a display control means for causing a display means for displaying an image to display plural windows in an arrangement; a selection means for selecting a window displayed on the display means; a switching means for switching a window being selected by the selection means from a first window to a second window, the second window being displayed in one of directions relative to the first window, the direction being indicated by an operation; and a receiving means for receiving an instruction to change an arrangement of windows on the display means, wherein the display control means, in a case where an instruction is received by the receiving means, changes the arrangement of the plural windows so that a relative positional relationship changes between a selected window being selected by the selection means and a non-selected window not being selected by the selection means.

In an embodiment of an information-processing device according to the present invention, the display control means may change the arrangement of the plural windows so that a non-selected window not being selected by the selection means, which is located adjacent to the selected window before the change of the arrangement is made is not adjacent to the selected window being selected by the selection means after the change of the arrangement is made.

In the information-processing device according to the present invention, the number of directions may be predetermined; and the display control means may determine a center window, and change the arrangement of the plural windows so that a window exists in each of the predetermined number of directions relative to the center window.

In this case, the center window may be the selected window. Also, the information-processing device may comprise identifying means for identifying a priority level for usage of each of the plural windows, and the display control means may determine a window having a higher priority level to be the center window.

In the information-processing device according to the present invention, the information-processing device may further comprise an identifying means for identifying a relevance level for each pair of the plural windows, and the display control means may change the arrangement of the plural windows so that the selected window is able to be switched to a window having a higher relevance level relative to the selected window by the switching means in a smaller number of switchings.

In the information-processing device according to the present invention, the information-processing device may further comprise a storage means for storing data on arrangements, and the display control means may change the arrangement of the plural windows on the basis of information stored in the storage means.

In the information-processing device according to the present invention, the display control means, in a case where the selected window extends beyond a predetermined display area of the display means, may move display positions of the plural windows so that the selected window does not extend beyond the predetermined display area, without changing the arrangement of the plural windows.

A program according to the present invention includes a computer to function as one of the information-processing devices described above. The program according to the present invention may be downloaded to a computer via a network such as the Internet, and installed in the computer so that the program can be used. The present invention may be implemented as a recording medium storing such a program such as an optical disk.

According to the present invention, since arrangement of windows are changed in accordance with an instruction, it is possible to enable a user to easily select a desired window, without using a special pointing device such as a mouse.

DETAILED DESCRIPTION

Figure 1:
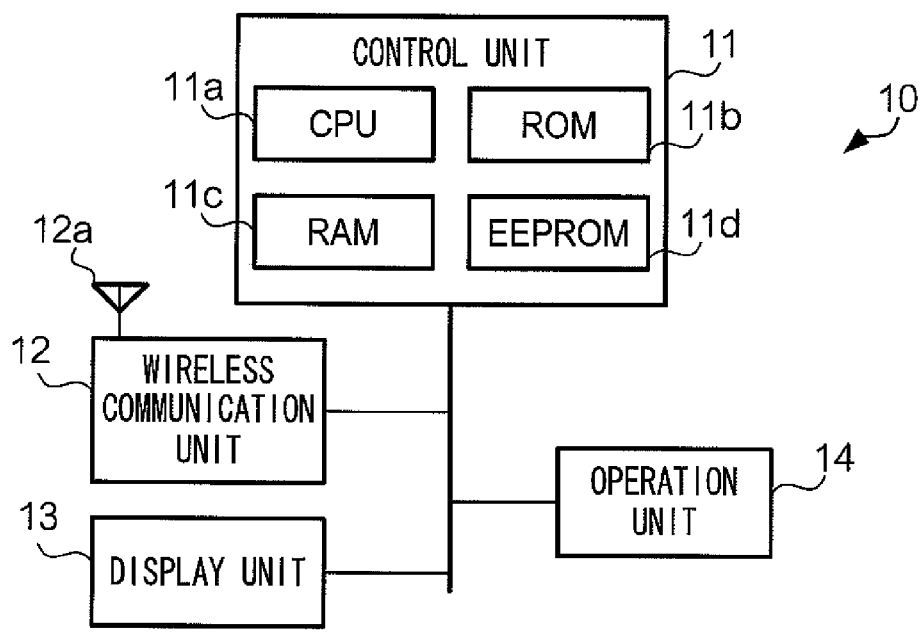
FIG. 1 is a block diagram showing a physical configuration of a communication terminal device.

FIG. 1 is a block diagram showing a physical configuration of a communication terminal device according to an embodiment of the present invention. As shown in the drawing, communication terminal device 10 comprises control unit 11, wireless communication unit 12, display unit 13, and operation unit 14. It is to be noted that communication terminal device 10 according to the present embodiment is a mobile phone having means for inputting and outputting a voice (not shown) such as a microphone and a speaker.

Control unit 11 includes CPU (Central Processing Unit) 11a, ROM (Read Only Memory) 11b, RAM (Random Access Memory) 11c, and EEPROM (Electronically Erasable and Programmable ROM) 11d, and CPU 11a executes a program stored in ROM 11b or EEPROM 11d while using RAM 11c as a work area, thereby controlling an operation of each unit of communication terminal device 10. Wireless communication unit 12 includes antenna 12a, and performs wireless data communication with a predetermined mobile communication network. Display unit 13 includes a liquid crystal display and a liquid crystal driving circuit, and displays an image in a predetermined display area based on display data provided from control unit 11. Operation unit 14 includes plural keys, and provides operation information to control unit 11, which corresponds to a press operation by a user. Operation unit 14 includes a key for selecting a window (hereinafter referred to as "direction key") and a key for changing the arrangement of the windows (hereinafter referred to as "change key"). By operating the keys, a user is able to select a window or change the arrangement of the windows. It is to be noted that the direction key is a key whereby one of four directions of left, right, up, and down is selected in the present embodiment; however, the direction key may be a key whereby a direction other than the four directions, such as an oblique direction (toward upper right or lower left) may be selected. Also, it is to be noted that the keys described above may be hard buttons or touch sensors provided over the liquid crystal display.

ROM 11b pre-stores some programs. Hereinafter, the programs will be referred to as "preinstalled programs." The preinstalled programs include a multitask operating system (hereinafter referred to as "multitask OS"), a Java™ platform, and native applications. The multitask OS is an operating system that supports functions such as assignment of a virtual memory space that are necessary to realize pseudo-parallel execution of plural tasks. The Java platform is a set of programs that are described in accordance with a CDC (Connected Device Configuration), which is a configuration for realizing Java Runtime Environment 130 (described later) in communication terminal device 10 in which the multitask OS is installed. The native applications are programs for realizing a basic function of communication terminal device 10 such as a telephone call.

EEPROM 11d includes Java application storage areas for storing Java applications. A Java application includes a JAR (Java Archive) file that is a combination of a substance program that describes a procedure in a Java Runtime Environment, and image files or audio files that are used when the substance program is executed; and an ADF (Application Descriptor File) in which properties of installation and start-up of the JAR file are described. The Java application is prepared by a content provider or a carrier, and stored in an external server device, and can be downloaded from the server device on request by communication terminal device 10.

Figure 2:
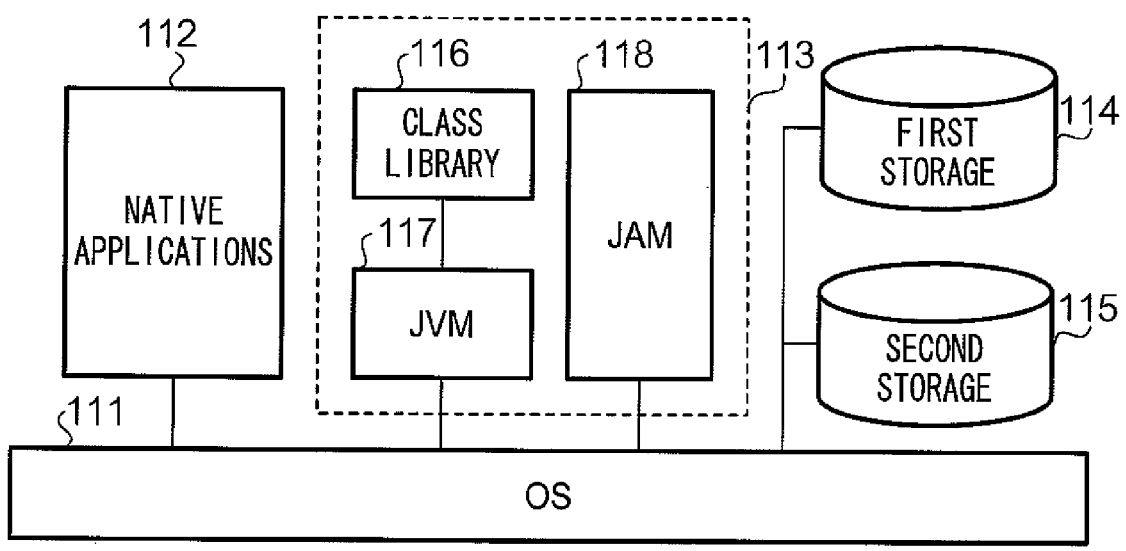
FIG. 2 is a diagram showing a logical configuration of a communication terminal device.

FIG. 2 is a diagram showing a logical configuration of units realized by control unit 11 of communication terminal device 10 by executing programs stored in ROM 11b and EEPROM 11d. As shown in the drawing, in communication terminal device 10 that executes the programs, native applications 112 and Java Runtime Environment 113 are realized in OS 111, and first storage 114 and second storage 115 are secured in EEPROM 11d.

Java Runtime Environment 113 is realized by use of the Java platform stored in ROM 11b. Java Runtime Environment 113 includes class library 116, JVM (Java Virtual Machine) 117, and JAM (Java Application Manager) 118. Class library 116 is a file of a combination of program modules (classes) that have a particular function. JVM 117 is a Java Runtime Environment that is optimized for the CDC described above, and has a function of interpreting and executing byte codes provided as a Java application. JAM 118 has a function of managing downloading, installation, start-up, and termination of Java applications.

First storage 114 is an area for storing Java applications, each of which includes a JAR file and an ADF, which are downloaded under control of JAM 118. Second storage 115 is an area in which an individual storage area is assigned to each installed Java application, and is used for storing data generated during running of Java applications after the applications are terminated. Data of a certain Java application in a storage area assigned to the Java application can be rewritten only when the application is running; therefore, the data cannot be rewritten by another Java application.

Java applications of the present embodiment include applications for displaying plural windows. The Java applications for displaying plural windows include a "window display application" and a "widget." The window display application is an application for displaying one or more windows in a display area of display unit 13, and controlling the display aspect. The widget is an application that realizes a predetermined function on the condition that the window display application displays a window.

A "window" of the present embodiment refers to a part of a display area of display unit 13 that is assigned to a widget, which is displayed as an image that can be distinguished from an image in another part of the display area. The shape and size (area) of the window are determined depending on a widget; however, the shape and size of the window may be changed.

In the present embodiment, plural widgets appear, each widget realizing a different function. The widgets include, for example, a widget for displaying a time and date by displaying a clock image in a window (hereinafter referred to as "clock widget"), a widget for displaying characters input by a user in a window as a memorandum (hereinafter referred to as "memo widget"), or a widget for playing a video or music (hereinafter referred to as "play widget"). Also, the widgets may include a widget that obtains information such as news or weather forecast via wireless communication unit 12 at a predetermined time, and displays the obtained information.

The foregoing is a description of the configuration of communication terminal device 10 according to the present embodiment. With the configuration, communication terminal device 10 executes plural applications in accordance with a request by a user. Communication terminal device 10 according to the present embodiment realizes a multi-window system by displaying windows of widgets. Namely, communication terminal device 10 runs a window display application when displaying plural windows. A user is able to select one from among plural windows or change a window that has been selected by operating the direction key of operation unit 14. In the following description, a window that has been selected will be referred to as "selected window," and a window that has not been selected will be referred to as "non-selected window" for convenience of explanation. It is to be noted that in the present embodiment the "selection" of a window means providing an input focus to the window.

Communication terminal device 10 puts a widget corresponding to a window that has been selected by a user to a state in which the widget carries out an operation that is different from an operation carried out when the window has not been selected. Namely, each widget is able to carry out different operations depending on whether a window corresponding to the widget has been selected. For example, a clock widget is able to carry out an operation to display a time and date when a corresponding window has not been selected, and is able to carry out an operation to change the time and date or the appearance such as a color of a window when the corresponding window has been selected. A memo widget is able to carry out an operation to display characters when a corresponding window has not been selected, and is able to carry out an operation to change (edit) characters when the corresponding window has been selected. A play widget is able to carry out an operation to play a video or music when a corresponding window has not been selected, and is able to carry out an operation to control the volume, or pause or fast-forward a video or music when the corresponding window has been selected. The operations are carried out depending on an operation performed by a user. For example, when a user performs an operation to set a clock, the time is changed accordingly.

The window display application can suspend displaying a list of plural windows. For example, in a case where a user starts a telephone call while the window display application is displaying a list, communication terminal device 10 carries out an interrupt processing to change the image displayed on display unit 13 to an image for a telephone call. To do so, control unit 11 of communication terminal device 10 generates display information indicating how plural windows are displayed, and stores the information in EEPROM 11d. Control unit 11 updates the display information each time the display of windows changes. The display information includes information indicating windows displayed at the time, information indicating the arrangement of the windows, and information indicating windows selected at the time. The display information also includes identification information identifying the windows. After the telephone call ends, and the user performs a predetermined operation, the window display application resumes the display of the list. Communication terminal device 10 resumes the display of the list in a display aspect similar to a display aspect in which the display of the list was performed before the display was suspended, by referring to display information.

Figure 3:
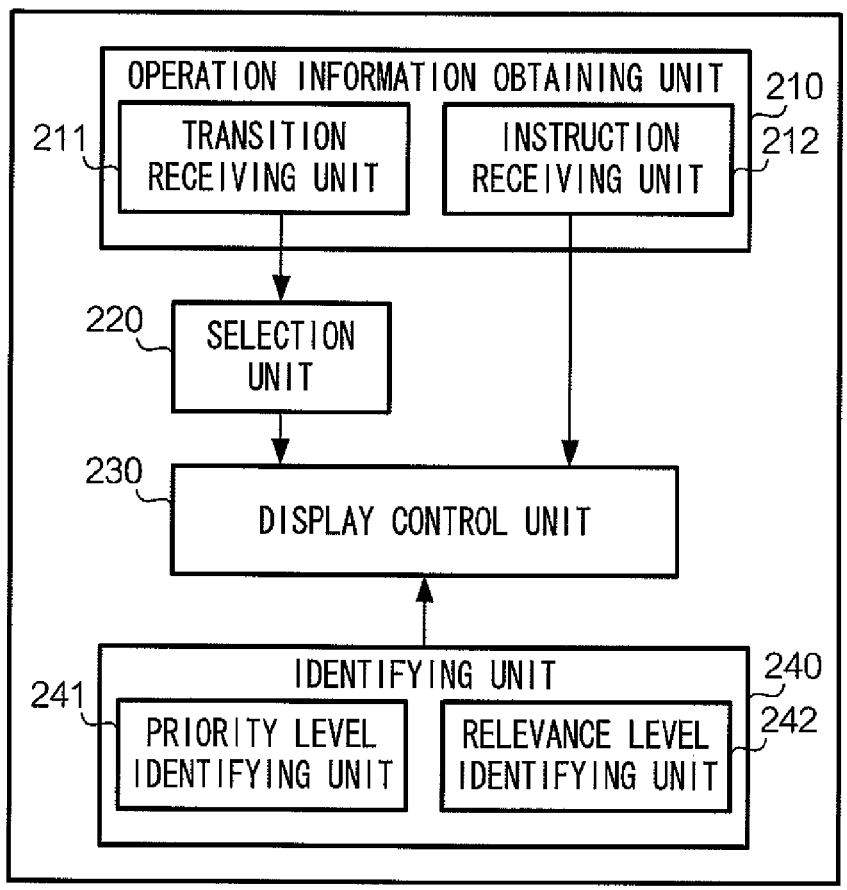
FIG. 3 is a functional block diagram showing functions realized by a communication terminal device.

FIG. 3 is a functional block diagram showing functions realized by control unit 11 of communication terminal device 10 when the control unit displays plural windows. As shown in the drawing, control unit 11 of communication terminal device 10 realizes functions corresponding to operation information obtaining unit 210, selection unit 220, display control unit 230, and identifying unit 240 by executing a stored program.

Operation information obtaining unit 210 has a function of obtaining operation information from operation unit 14. Operation information obtaining unit 210 identifies an operation by a user on the basis of a key operated by the user and an operation being carried out by control unit 11. Operation information obtaining unit 210 includes transition receiving unit 211 and instruction receiving unit 212. Transition receiving unit 211 receives an operation instruction to change a selected window. Transition receiving unit 211 functions when a certain window is a selected window and any one of the operation directions is selected using the direction key. Instruction receiving unit 212 receives an instruction to change the arrangement of the windows. Instruction receiving unit 212 functions when plural windows are being displayed and the change key is pressed.

Section unit 220 has a function of, when plural windows are displayed, selecting a selected window from among the plural windows. Selection unit 220, when selecting a selected window, may determine a selected window on the basis of pre-stored display information, or determine a selected window in accordance with an operation by a user. For example, selection unit 220, in a case where transition receiving unit 211 receives an operation instruction to change a selected window, changes a selected window in accordance with the operation. Namely, a function realized by selection unit 220 in this case is a function of changing a selected window from one window to another window. In this case, selection unit 220 identifies an operation direction that has been selected, and specifies a non-selected window that is located in the operation direction relative to a selected window and that is closest to the selected window, as a selected window.

Display control unit 230 has a function of controlling display of a window on the basis of external information. Specifically, display control unit 230 starts or terminates display of a window, or changes a display position of a window on the basis of external information. Display control unit 230 also performs a display control to change display of a window in response to transition of a selected window, and performs a display control to change the arrangement of the windows in response to pressing of the change key. Display control unit 230 displays a selected window and a non-selected window so that they can be distinguished from each other.

Figure 4:
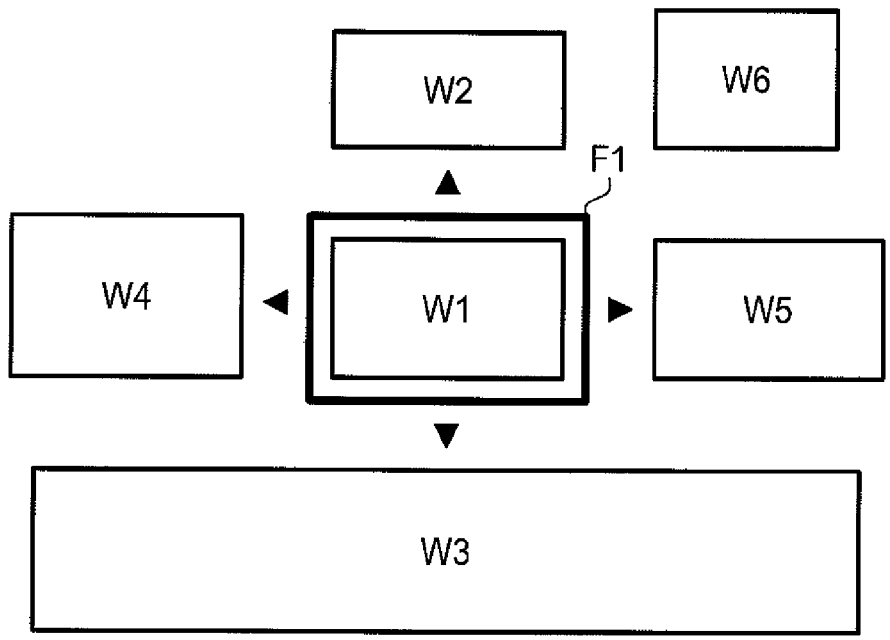
FIG. 4 is a diagram showing an example of display aspects of both a selected window and a non-selected window.

FIG. 4 is a diagram showing an example of display aspects of a selected window and non-selected windows. As shown in the drawing, display control unit 230, in a case where a selected window is window W1, differentiates window W1 from windows W2 to W6, which are non-selected windows, by adding frame F1 to window W1. It is to be noted that a method of differentiating a selected window from a non-selected window is not limited to this example, and a method of blinking a selected window or a method of making a non-selected window appear to be translucent may be employed.

A transition of a selected window is performed on the basis of an operation direction selected using the direction key. For example, in a case where a selected window is window W1, display control unit 230 recognizes that windows W2 to W5, which are located to left, right, up, or down directions relative to window W1, are windows that can be subsequently selected. In this case, if a user selects window W6, a selected window is changed from window W1 to window W2 (or W5), and further changed to window W6. Namely, two transitions have to be performed.

Display control unit 230 may display a predetermined character or image as a mark between a selected window and a window that can be subsequently selected. By performing such a display, it becomes easier for a user to recognize a window that can be subsequently selected. It is to be noted that in a case where there are plural windows that can be subsequently selected in an operation direction as in a case shown in FIG. 4 in which window W3 is a selected window (in this case, plural windows exist in an upper direction), a window is recognized as a window that can be subsequently selected in accordance with a predetermined rule, and a mark is displayed in connection with the window.

Identifying unit 240 has a function of identifying information that affects a change in arrangement of windows, if such information exists, and providing the information to display control unit 230. Identifying unit 240 comprises priority level identifying unit 241 for identifying priority levels related to usage of plural windows, and relevance level identifying unit 242 for identifying levels of relevance of plural windows.

It is to be noted that the present embodiment is an embodiment in which identifying unit 240 is not enabled, so that identifying unit 240 does not provide information to display control unit 230. An embodiment in which identifying unit 240 is enabled will be explained in a modification described later.

Figure 5:
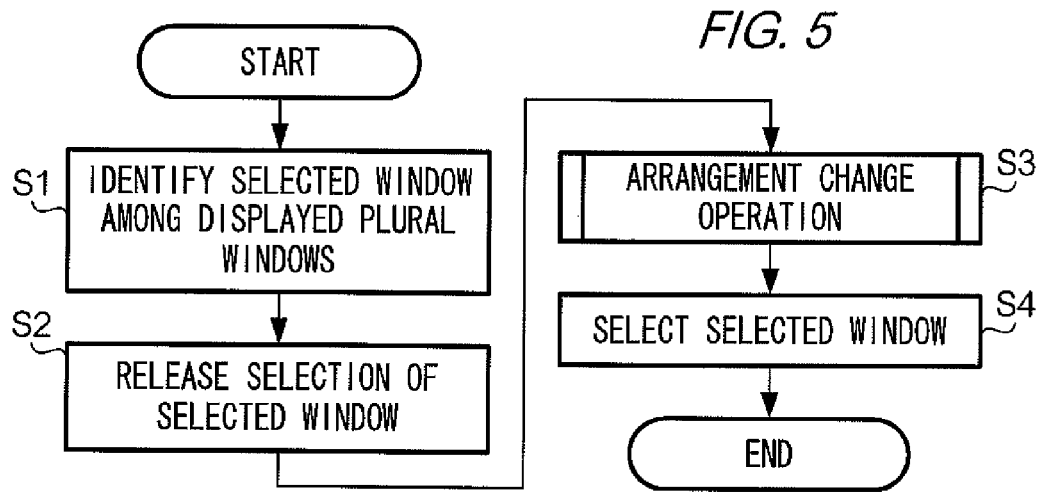
FIG. 5 is a flowchart showing a display control carried out by a communication terminal device.

FIG. 5 is a flowchart showing a display control carried out by control unit 11 having the configuration and the functions described in the foregoing. The operation shown in the flowchart is triggered by pressing of the change key. It is to be noted that it is assumed that plural windows are displayed in display unit 13, when the display control is carried out. It is to be noted also that the operation can be carried out if two or more windows are displayed; however, it is preferable that three or more windows are displayed.

As shown in FIG. 5, control unit 11 identifies a selected window from among displayed plural windows (step S1). Specifically, control unit 11 identifies a selected window by recognizing identification information of a selected window based on display information. Subsequently, control unit 11 de-selects the selected window (step S2). When doing so, control unit 11 suspends accepting performance of any operation by a user. Namely, while control unit 11 is receiving operation information, the information is not reflected on the display. It is to be noted that the operations of steps S1 and S2 are pre-operations carried out in preparation for changing arrangement of windows.

After completing the pre-operations, control unit 11 carries out an operation to change arrangement of windows (step S3). The operation will be described as "arrangement change operation" in the following. The arrangement change operation may be carried out in accordance with a predetermined rule. Alternatively, the arrangement change operation may be carried out on a random basis whereby arrangement of windows is determined also on a random basis. However, as compared with a case in which the arrangement change operation is carried out on a completely random basis, in a case in which the arrangement change operation is carried out in accordance with a certain rule, there is a high possibility that operability for a user is increased so that a user is able to select a desired window easily.

After completing the arrangement change operation, control unit 11 selects the window that was identified at step S1, as a selected window again (step S4). At the same time, control unit 11 cancels the suspension of accepting performance of any operation by a user, so that a user is able to change a selected window. The operation of step S4 is a post-operation, which is carried out after arrangement of windows is changed. The operation of step S4 is associated with the above pre-operation.

The foregoing is a summary of the display control carried out by control unit 11. In the following, the arrangement change operation of step S3 will be described using a concrete example.

Figure 6:
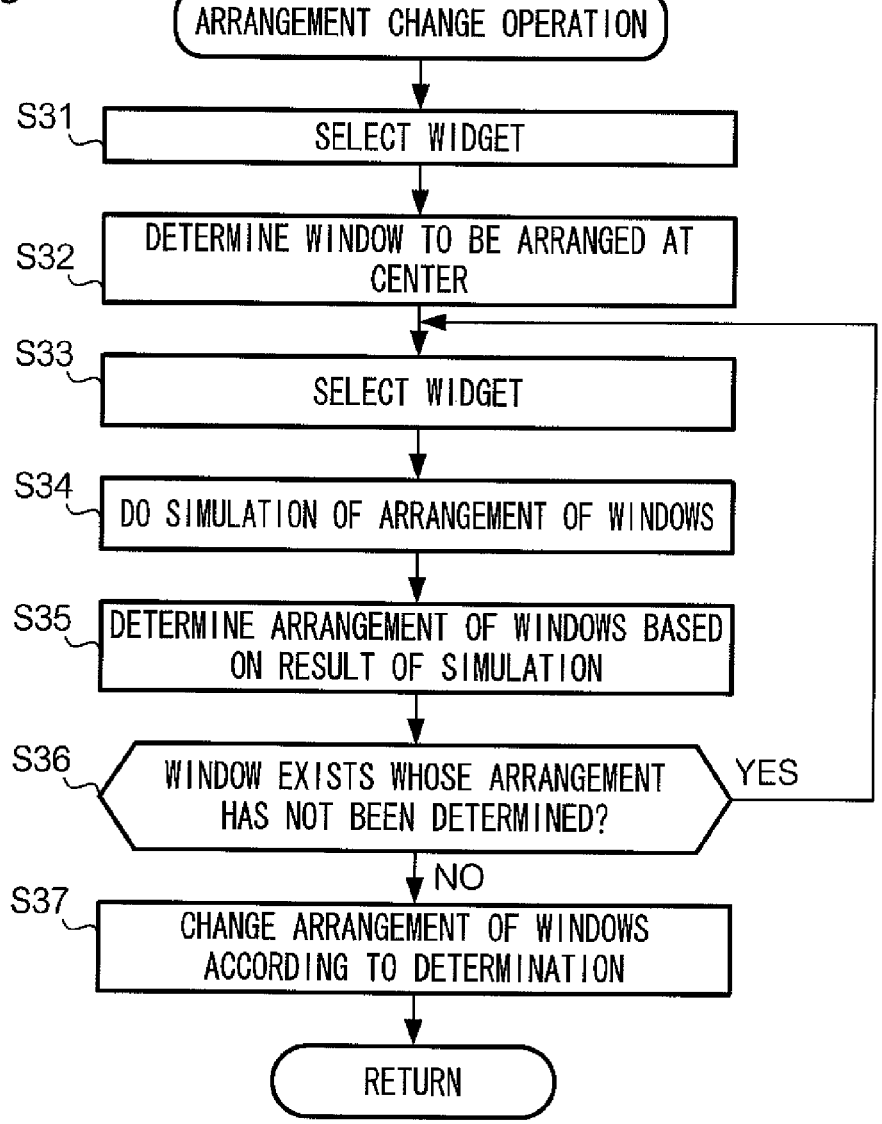
FIG. 6 is a flowchart showing an arrangement change operation carried out by a communication terminal device.

FIG. 6 is a flowchart showing an arrangement change operation carried out by control unit 11. As shown in the drawing, control unit 11 selects a widget from among plural widgets whose windows are displayed (step S31). Selecting a widget is identical to selecting a window to which the widget corresponds. Control unit 11 makes a determination to arrange a window corresponding to the widget at the center of the display area of display unit 13 (step S32). The window whose arrangement is determined will be referred to hereinafter as "center window." A center window is a window whose arrangement is firstly determined. It is to be noted that the term "center" refers to a reference position for arranging windows; a "center" is not necessarily simply the center of the display area.

Subsequently, control unit 11 selects a widget from among plural widgets whose windows are displayed and which have not been selected (step S33). Selecting a widget is identical to selecting a window to which the widget corresponds, as described above. Control unit 11 performs a simulation of positioning a window corresponding to the selected widget adjacent to the window whose arrangement has been determined (step S34). When doing so, control unit 11 performs a simulation of positioning a window in all possible operation directions in which the window can be arranged, for each window whose arrangement has been determined. It is to be noted that "adjacent" refers to a condition in which windows are properly spaced so that they do not overlap each other. Control unit 11 determines an appropriate arrangement on the basis of a result of the simulation of step S34 (step S35).

Figure 7:
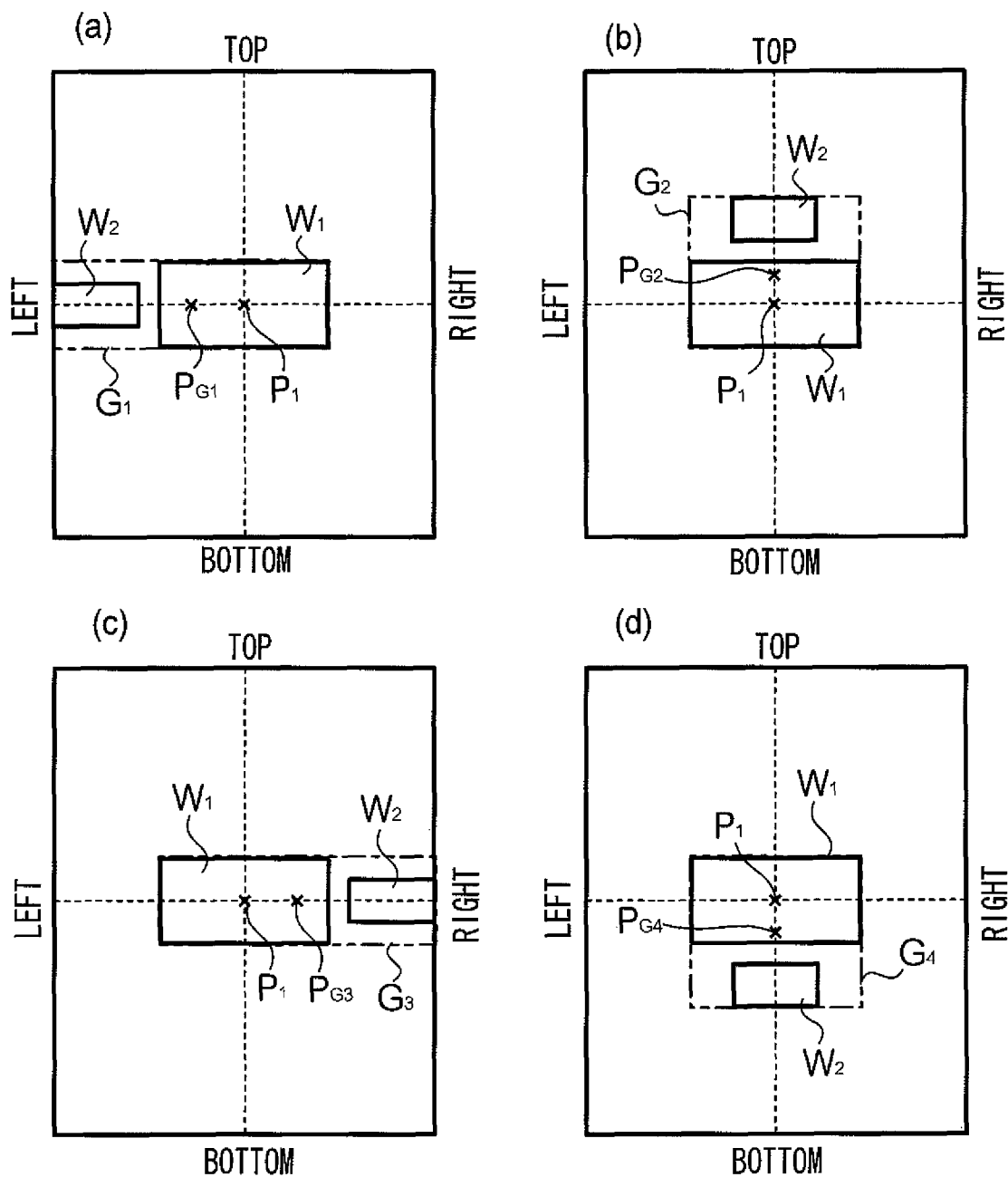
FIG. 7 is a diagram showing an example of a simulation that is run by a communication terminal device.
Figure 8:
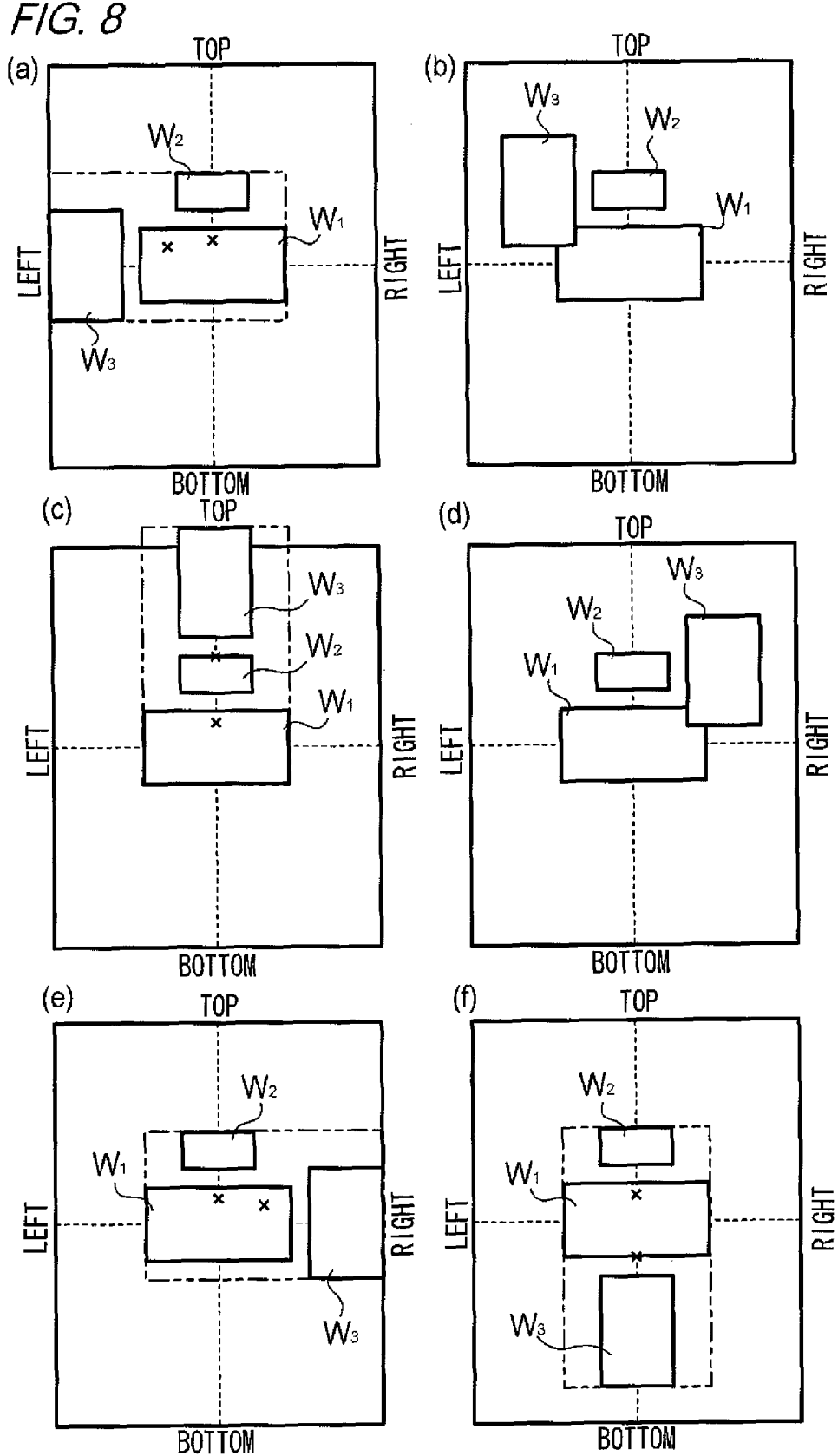
FIG. 8 is a diagram showing an example of a simulation that is run by a communication terminal device.

FIGS. 7 and 8 are diagrams for describing an example of a simulation carried out by control unit 11. FIG. 7 is a diagram showing an example of a simulation that is carried out when a window has been arranged at the center of the display area. FIG. 8 is a diagram showing an example of a simulation that is carried out when another window has been arranged on the basis of a result of the simulation of FIG. 7. In FIG. 7, window $W_1$ is a window arranged at the center, and window $W_2$ is a window that is a subject for a simulation. The solid line surrounding windows $W_1$ and $W_2$ defines the display area in which windows are displayed.

As shown in FIG. 7, control unit 11 assumes cases where window $W_2$ is arranged in each operation direction relative to window $W_1$, and calculates a distance between the center of window $W_1$ and the center of a window group, for each case. When making the assumption, control unit 11 carries out a simulation so that the middle point of a side of window $W_2$, which is adjacent to window $W_1$, is positioned along an operation direction relative to the middle point of a side of window $W_1$, which is adjacent to window $W_2$.

In the description, the "center" of a window refers to the center point of a window if the window is a point-symmetric figure. Alternatively, the "center" of a window may be a median point of a window identified when the window is assumed to be a plate-like object having uniform density. In FIG. 7, the center of window W1 is represented by symbol $P_1$. Also, a "window group" is represented by a minimal rectangle (or square) that surrounds all windows whose arrangement has been determined. In FIG. 7, two-dot chain lines shown by symbols $G_1$ to $G_4$ define window groups, and symbols $P_{G1}$ to $P_{G4}$ represent the centers of the window groups. The center of a window group is a center point identified when the rectangle described above is assumed to be a window.

When determining an appropriate arrangement, control unit 11 determines to be appropriate an arrangement in which the distance between the center of window $W_1$ and the center of the window group is minimal. In FIG. 7, such an arrangement is an arrangement in which window $W_2$ is positioned in an upper direction or lower direction relative to window $W_1$. Accordingly, control unit 11 determines one of the arrangements to be appropriate.

Control unit 11 also carries out a simulation in a similar manner for a window that is to be subsequently arranged and has not been selected. In an example shown in FIG. 8, a distance between the center of the window group defined by windows $W_1$ and $W_2$ ($P_{G2}$ of FIG. 7) and the center of a window group defined by windows $W_1$, $W_2$, and $W_3$ is compared. In the case shown in FIG. 8 where there are plural windows whose arrangement has been determined, a simulation is carried out for each of the plural windows. It is to be noted that an arrangement in which a window overlaps another window in a simulation is excluded as a candidate for selection. For example, arrangements shown in FIGS. 8(*b*) and 8(*d*) are not appropriate since in the arrangements a part of window $W_3$ overlaps another window. In the example of FIG. 8, an arrangement of FIG. 8(*a*) or 8(*e*) may be determined to be appropriate.

After determination of arrangement of windows as described in the foregoing, control unit 11 determines whether arrangement has been determined for all windows displayed (step S36). If there are windows whose arrangement has not been determined, control unit 11 selects one of the windows, and carries out the operations of step S33 and subsequent steps again. If there are no windows whose arrangement has not been determined, control unit 11 changes arrangement of the windows based on the determinations of steps S32 and S35 (step S37). Specifically, control unit 11 provides an instruction to display unit 13 to change a displayed image.

When a displayed image is changed, control unit 11 may apply an appropriate visual effect to an image displayed. For example, control unit 11 may display an image different from that of a window (e.g., an image showing a message "Please wait" or an image of a sand clock) while the arrangement is being changed. Alternatively, control unit 11 may display images of windows that show in animation a gradual change of the arrangement from a pre-change arrangement to a post-change arrangement. In addition, control unit 11 may generate an appropriate sound for informing a user that a change of a displayed image is being carried out.

The visual effect may be applied in a given timing during a time period from when the change key is pressed till the arrangement of all displayed windows is determined. According to the configuration, a situation in which an image remains still is avoided even if a determination of the arrangement takes some time.

A specific method for selecting a widget in steps S32 and S33 may be selected arbitrarily as long as a widget can be selected appropriately. For example, a method using an array may be employed.

Figure 9:
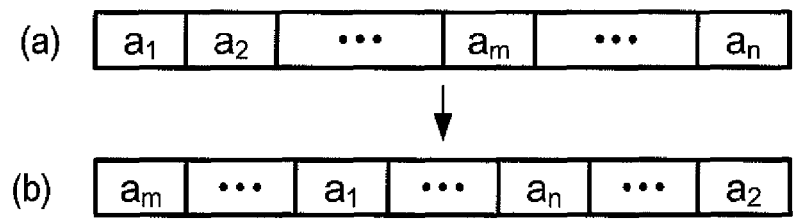
FIG. 9 is a schematic diagram showing examples of an array used for selecting a widget.

FIG. 9 is a schematic diagram showing examples of an array used for selecting a widget. FIG. 9 shows an array (FIG. 9(*a*)) and another array (FIG. 9(*b*)) in which elements of the array of FIG. 9(*a*) are rearranged. In the drawing, $a_1, a_2, \ldots, a_m, \ldots, a_n$ represent elements of an array, each of which corresponds to a displayed window (or a widget of the window). Symbols m and n represent integers that satisfy a relationship m<n. The elements of an array are information for identifying a displayed window. If a new window is displayed, an element corresponding to the window is added to an array. If a window is closed, an element corresponding to the window is deleted from an array. In an array, an element corresponding to a window whose continuous display time is longer is positioned at the left side. The leftmost element is referred to "first" element, and subsequent elements are referred to as "second" element, "third" element, . . . , and "nth" element, respectively.

Control unit 11 changes an order of elements included in an array before selecting a widget in steps S31 and S33. An algorithm for rearranging elements may be determined arbitrarily. Each time control unit 11 selects a widget in step S31 or S33, the control unit select a first element from among rearranged elements of an array, and determines a window corresponding to the selected element to be a subject for selection. Control unit 11 selects a first element when a first selection is made, and selects a second element when a second selection is made.

The foregoing is a description of the display control of the present embodiment. According to the display control, it is possible to reduce the number of times a user must press the keys to select a desired window, as compared with a case in which the display control is not performed. Namely, it is possible to improve operability for selecting a window. The effect of the display control is felt better as the number of windows being displayed increases. Also, the effect of the display control is felt better as the number of times a user has to press the direction keys to select a desired window increases.

Figure 10:
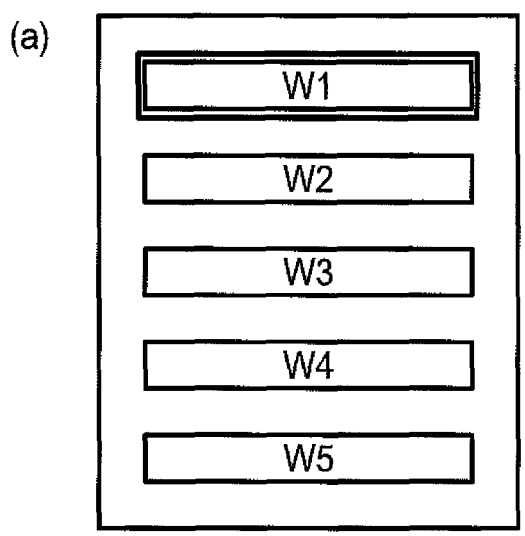
FIG. 10 is a diagram for describing an effect of an embodiment.
Figure 10:
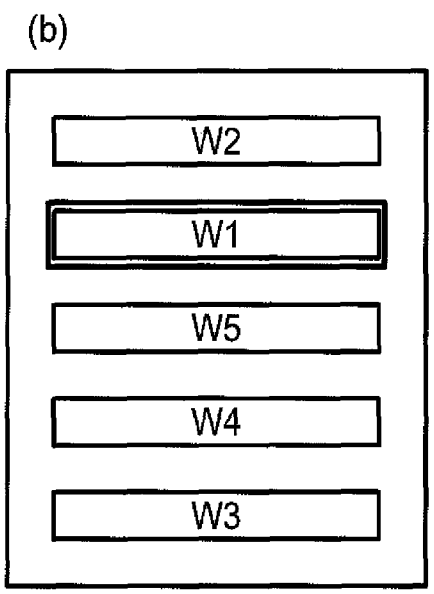
Figure 10:
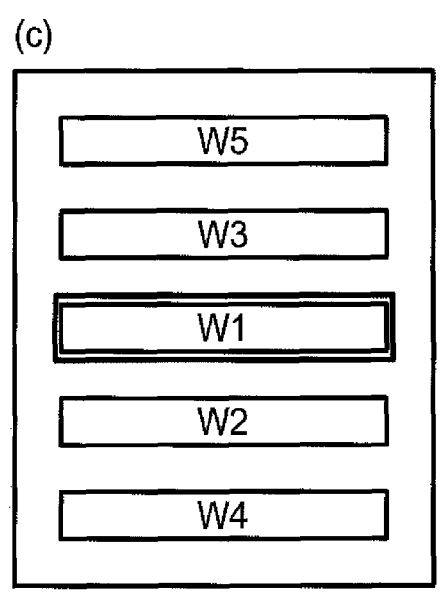

FIG. 10 is a diagram for describing an effect of the present embodiment. In this description, it is assumed that five windows W1 to W5 are arranged vertically in the display area, as shown in FIG. 10(*a*), and that window W1 is a selected window, and window W5 is a desired window (a window a user wishes to set as a selected window). In this case, a user has to press the direction key downward four times to select window W5.

In contrast, in a case where the display control of the present embodiment is carried out so that arrangement of windows is changed to an arrangement shown in FIG. 10(*b*), a user is able to select window W5 only by pressing the change key one time and the change key downward one time. Namely, the number of required operations is reduced by two as compared with the case where arrangement is not changed (four times). Also, in a case where arrangement of windows is changed to an arrangement shown in FIG. 10(*c*), the number of required operations is three, which is smaller than the number in the case where arrangement is not changed.

It is to be noted that if the number of operations does not decrease after the arrangement is once changed a user may change the arrangement plural times by pressing the change key plural times. In doing so, a user repeatedly presses the same key; accordingly, an operation is easier as compared with a case in which different keys are pressed (for example, a case in which "up," "right," and "up" buttons are pressed).

The present invention may be implemented in an embodiment that is different from the above embodiment. For example, the present invention may be implemented in the embodiments described below. It is to be noted that the following modifications may be combined with each other.

An arrangement changing operation according to the present invention only needs a change in relative positional relation between a selected window and a non-selected window. Accordingly, all windows being displayed may be moved, or alternatively a part of the windows being displayed may be moved. For example, in an arrangement changing operation according to the present invention, positions of only non-selected windows surrounding a selected window may be changed, while a position of the selected window is not changed. Even if a position of a selected window is not changed, a desired non-selected window can be located closer to the selected window so that the number of operations performed by a user for selecting the non-selected window is reduced. In the example, a position of a part of non-selected windows may not be changed.

In the arrangement change operation of the present invention, a center window may be a non-selected window or a selected window. However, since a center window is a window around which other windows are arranged whereby it is likely that the center window has more selectable windows in operation directions than the other windows do, it is preferable that a center window is a selected window. In a case where a center window is a selected window, it is likely that there are more windows that can be selected by one operation; accordingly, it is likely that a user is able to select a desired window by a reduced number of operations.

In the arrangement change operation of the present invention, the simulation described above is not a necessary operation. In a case where shapes or sizes of windows are fixed, and arrangement is made in accordance with a predetermined rule, a possibility of inconvenience being caused to a user is relatively low.

Figure 11:
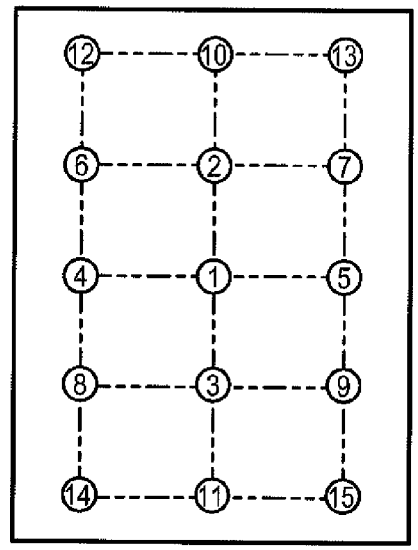
FIG. 11 is a diagram for describing a rule of arrangement of windows.

FIG. 11 is a diagram showing an example of a rule of arrangement. Encircled numbers of the drawing show an order in which windows are positioned. In the example, a grid is defined in the display area, which is formed by a predetermined number of rows and columns, and windows are positioned at intersections of the grid. According to the rule, positions to which a transition from a center window can be made by one operation are prioritized, and windows are arranged at such positions in order. Subsequently, windows are arranged at positions to which a transition from a center window can be made by two operations and which are near the center of the center window.

When the present modification is applied, it is preferable that not only the present modification but also modification 2 described above is applied.

The arrangement change operation of the present invention is carried out mainly when a desired window, which is a non-selected window to be selected, is not near a selected window, whereby the desired window cannot be selected by a small number of operations. Accordingly, when the arrangement change operation of the present invention is carried out, it is likely that a desired window is not displayed near a selected window.

In view of this, an exceptional condition may be provided that a non-selected window located adjacent to a selected window before a change of arrangement is made is not relocated, whereby the non-selected window is adjacent to the selected window after the change of arrangement is made, and control unit 11 may make a selection of step S33 in accordance with the condition. If the selection is made in accordance with the condition, a possibility that a desired window is arranged at a position adjacent to a selected window increases. Namely, a possibility increases that a user can select a desired window by a reduced number of operations.

Alternatively, control unit 11 may use, instead of the above condition, a condition that a non-selected window located within a range selectable from a position of a selected window by a predetermined number of operations or less (for example, two operations) before a change of arrangement is made, is not relocated, whereby the non-selected window is within a range selectable from a position of the selected window by a predetermined number of operations or less (for example, one operation) after the change of arrangement is made. If the condition is used, the same effect is obtained.

In the arrangement change operation of the present invention, a situation can occur in which arrangement is the same before and after the operation is carried out. If such a situation occurs, the arrangement change operation has no merit. Accordingly, it is preferable that control unit 11, if a situation can occur in which arrangement is the same before and after an arrangement change operation is carried out, determines an arrangement to prevent the situation from occurring. Alternatively, control unit 11 may, if it is determined that arrangement is the same before and after an arrangement change operation is carried out, carry out another simulation.

A priority level identified by control unit 11 (priority level identifying unit 241) is information determined based on usage of a corresponding widget or information specified by a user. Data on a priority level is stored in EEPROM 11d. A priority level may be set to be higher as time spent using a widget is longer or a frequency with which a widget is used is higher. Alternatively, a priority level may be specified by a user using a value.

Control unit 11 changes arrangement of windows on the basis of priority levels. When doing so, control unit 11 may identify a widget having a higher priority level, and determine a window corresponding to the widget to be a center window. Also, control unit 11 may arrange a window corresponding to a widget having a higher priority level at a position that is selectable from a position of a selected window by a smaller number of operations. Specifically, control unit 11 may arrange a window corresponding to a widget having a highest priority level adjacent to a selected window.

Also, control unit 11 may identify plural widgets in order of decreasing priority, and arrange windows corresponding to the widgets so that a window of a widget having a highest priority level is surrounded by windows of the other widgets, and that the windows of the other widgets are located adjacent to the window of the widget having a highest priority level along operation directions. For example, control unit 11 may identify five widgets in order of decreasing priority, and arrange, to the left, right, top, and bottom of a window of a widget having a highest priority level, the other four widgets.

A relevance level identified by control unit 11 (relevance level identifying unit 242) is information determined based on usage of corresponding widgets or specified by a user. Data on a relevance level priority level is stored in EEPROM 11d. A relevance level may be set to be higher as a time for which widgets are simultaneously used is longer or a frequency with which widgets are simultaneously used is higher. Alternatively, a relevance level may be pre-specified by a user. In a case where widgets that cooperate with each other are predetermined, a relevance level for the widgets may be set to be higher. Whether a widget cooperates with another widget may be determined on the basis of a name of the widget or a creator described in an ADF.

Control unit 11 changes arrangement of windows on the basis of relevance levels. For example, if a window exists that has a higher relevance level relative to another window, control unit 11 controls arrangement so that a number of operations required for selecting one of the windows from a position of the other window is reduced. Such a control may be applied to all displayed windows, or may be applied to only a part of the windows (for example, a selected window).

Control unit 11 may store data on a history of arrangements. Control unit 11 may, each time an arrangement is changed, store data on the pre-change arrangement in EEPROM 11d. Also, control unit 11 may cause display unit 13 to display stored arrangements, receive a selection from a user, and change (restore) arrangement to the selected arrangement. Accordingly, a user can restore a preferred arrangement when s/he needs it, or if a result of a change of arrangement is not a preferred one, restore the arrangement to a past arrangement.

It is to be noted that when a stored arrangement is retrieved and windows are arranged, the windows may be undisplayed. Control unit 11, when starting execution of a window display application, may cause display unit 13 to display stored arrangements, then, in response to a selection of a preferred arrangement by a user, start execution of widgets relevant to the arrangement so that windows are displayed.

Also, control unit 11, in a case where a combination of plural windows is displayed, and an arrangement for the combination is stored, may notify the existence of the arrangement to a user by a sound or image, and receive an instruction to restore the arrangement.

The display area of display unit 13 may have a size similar to that of an area in which windows can be arranged. Alternatively, the display area of display unit 13 may have a size larger or smaller than that of an area in which windows can be arranged. An area for displaying windows may be the entire display area of display unit 13, or a part of the display area.

Figure 12:
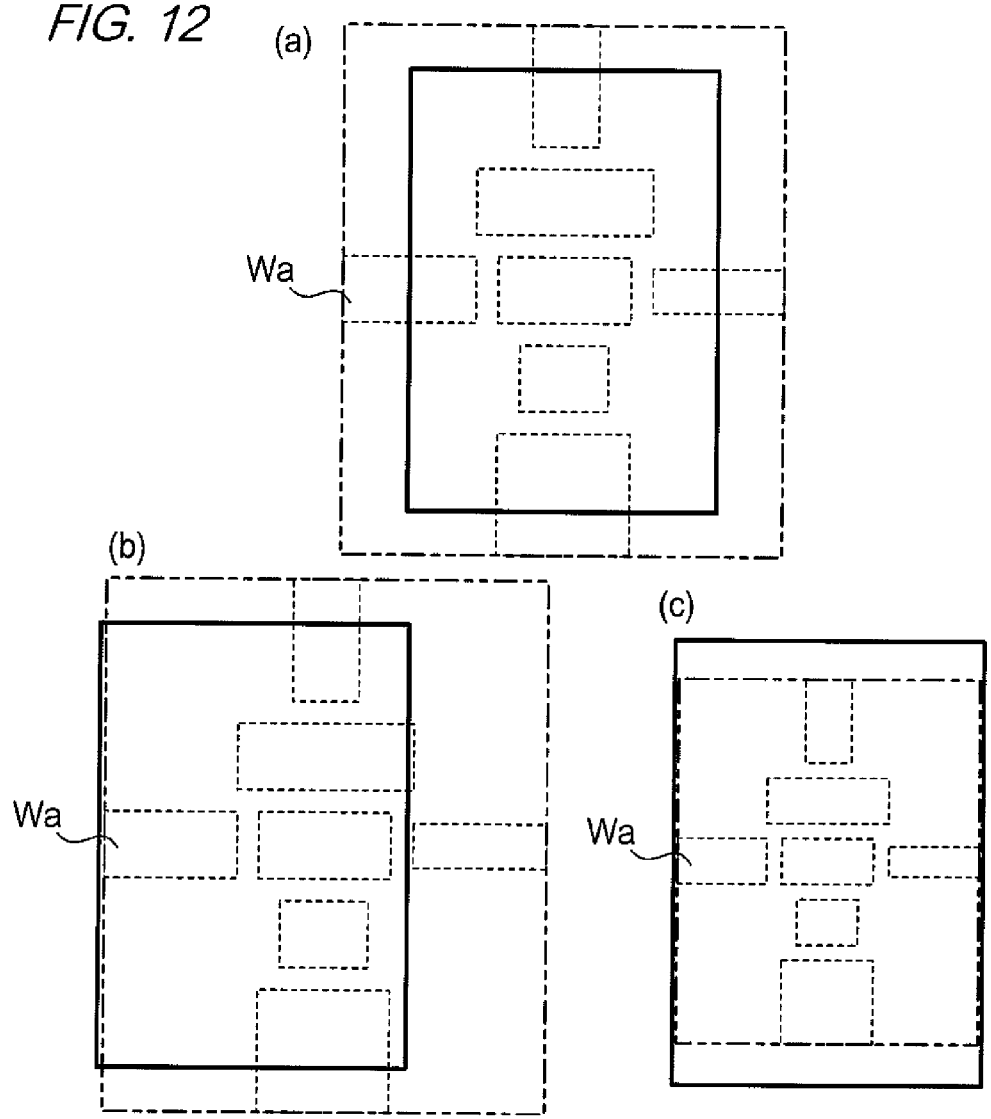
FIG. 12 is a diagram showing an example each of movement and reduction of an arrangement to be displayed.

FIG. 12 is a diagram showing a case in which the display area of display unit 13 is smaller than an area in which windows can be arranged. In the drawing, the display area of display unit 13 is a rectangular area surrounded by the solid line, and an area in which windows can be arranged is a rectangular area surrounded by the two-dot chain line. The dashed lines represent windows that have been arranged.

In a case where an area shown in FIG. 12(*a*) is displayed, a part of some windows is not displayed. For example, in the drawing, the left part of window Wa is not displayed. Namely, window Wa extends beyond the display area of display unit 13. In this case, if the window that is not fully displayed is a selected window, identification of a selected window by a user is hindered.

In view of this, control unit 11 may, in the case where the area shown in FIG. 12(*a*) is displayed and a selection window extends beyond the display area of display unit 13 so that a part of the selected window is not displayed, change a display of plural windows so that the entire selected window is displayed. A method for fully displaying a selected window in the display area of display unit 13 may be parallel-moving all windows so that only a displayed area is changed while the arrangement is not changed (see FIG. 12(*b*)), or reducing sizes of all windows and displaying them (see FIG. 12(*c*)). The examples shown in FIGS. 12(*b*) and 12(*c*) are cases where window Wa is a selected window. A rate of reduction in size may be determined arbitrarily. A reduction in size may be performed so that all windows are fully displayed in the display area of display unit 13. Alternatively, a reduction in size may be performed so that a selected window is fully displayed in the display area of display unit 13 while a non-selected window extends beyond the display area.

Figure 13:
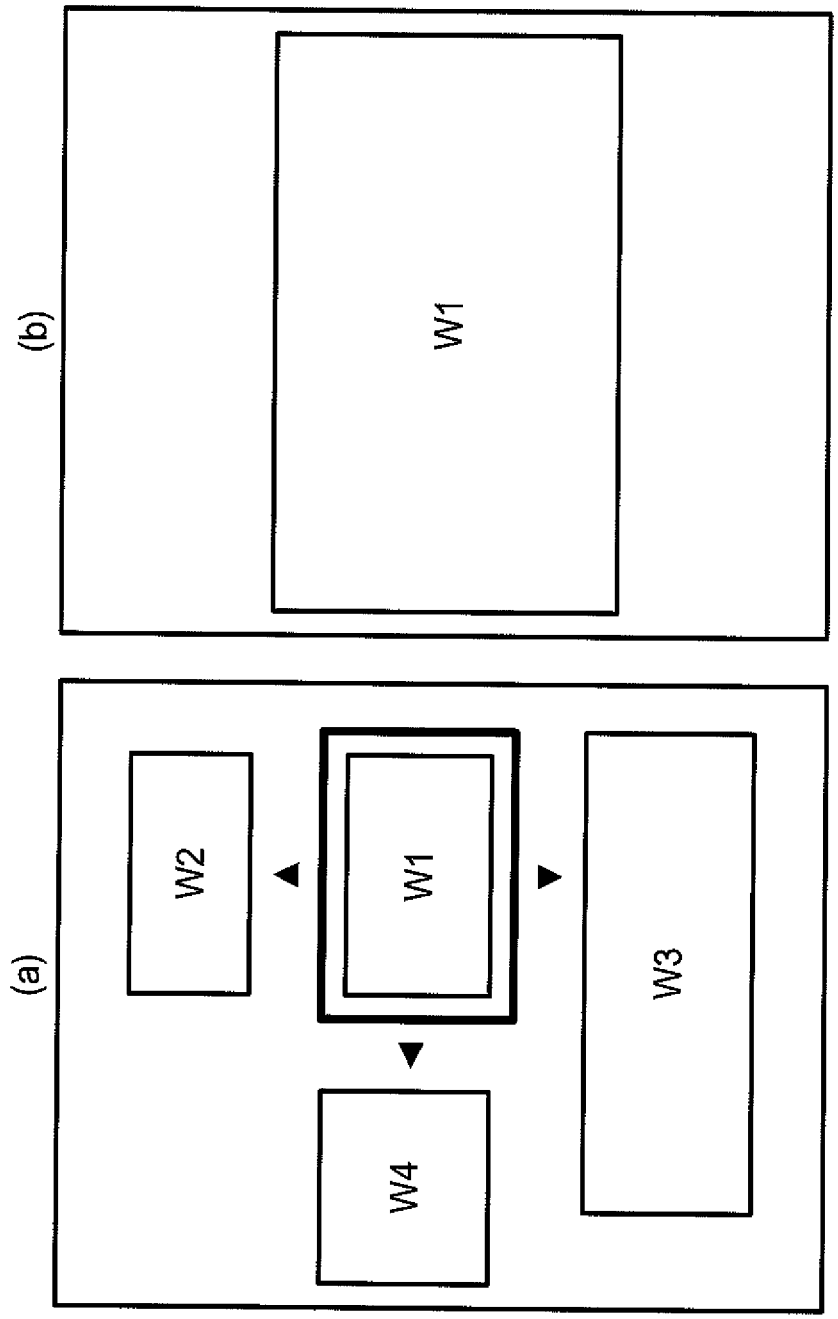
FIG. 13 is a diagram showing an example of a display aspect of a selected window.

In the present invention, a selected window may have different display aspects. The different display aspects may gradually change in response to receipt of performance of a predetermined operation. FIG. 13 is a diagram showing an example of a display aspect of a selected window. FIG. 13(*a*) shows an example of an aspect in which selected window W1 is displayed together with non-selected windows W2 to W4. FIG. 13(*b*) shows an example of an aspect in which only selected window W1, which is enlarged, is displayed. In a case where windows displayed in an aspect shown in FIG. 13(*a*) are so small that a user has difficulty in recognizing contents displayed in the windows, the windows may be enlarged, as shown in FIG. 13(*b*).

An enlarged display as shown in FIG. 13(*b*) may be displayed subsequently to a display shown in FIG. 13(*a*) and receipt of a predetermined operation. In this case, a display aspect of a selected window has two stages; one is a stage as shown in FIG. 13(*a*), and the other is a stage as shown in FIG. 13(*b*); and a widget may be able to carry out different operations depending on a stage of display of a selected window. For example, a clock widget described above may display a time and date in a predetermined display aspect when the widget is not being selected, display a time and date in a display aspect different from that of the case in which the widget is not being selected, at the stage shown in FIG. 13(*a*), and carry out an operation to change a time and date or the appearance at the stage shown in FIG. 13(*b*). In this case, only a time may be displayed when a widget is not being selected, and a time and date, and a day may be displayed when a widget is being selected.

A window according to the present invention may be not only a display area assigned to a "widget" of the above embodiment, but also a display area assigned to another application such as a native application. Also, a widget may be not only a Java application, but also another application. Also, in the above embodiment where display of plural windows is enabled by executing a window display application, which is a Java application, display of plural windows may be enabled by another application such as an OS.

Also, a widget may obtain information via a means other than wireless communication unit 12. For example, if an information-processing device according to the present invention has a so-called IC tag, a widget may obtain information stored in the IC tag. Alternatively, if an information-processing device according to the present invention has a GPS positioning function, a widget may obtain location information (a latitude and longitude or a distance from a given point) using the positioning function.

The above embodiment is an embodiment in which overlapping of windows is avoided. However, the present invention may be implemented in an embodiment in which windows are overlapped with each other. Namely, the present invention can be implemented in a system of overlapping windows. Also, the present invention can be applied to a so-called tiling window system in which plural windows are displayed side-by-side. When the present invention is applied to a tiling window system, adjacent windows may be arranged with no space between them.

It is to be noted that in the present invention, arrangement of images such as an icon, instead of windows, may be changed. In the present invention, a term "window" should be interpreted as a concept including an image such as an icon.

In the above embodiment, control unit 11 may be deemed as corresponding to an information-processing device according to the present invention, and communication terminal device 10 may be deemed as corresponding to the information-processing device. In a case where communication terminal device 10 is deemed as an information-processing device according to the present invention, a transition means and a receiving means are realized by cooperation of control unit 11 and operation unit 14. An operation according to the present invention may be not only a pressing of a key, but also recognition of a vocal instruction.

The above embodiment is an embodiment in which the present invention is applied to a mobile phone. However, the present invention may be applied to another electronic device. The present invention may be applied to a communication terminal device such as a PDA (Personal Digital Assistance), or an information-processing device such as a camera, a portable music player, or a portable game device.

The functions shown in FIG. 3, which are realized by communication terminal device 10, may be realized by a collection of programs or cooperation of plural hardware resources. For example, operations corresponding to display control unit 230 and identifying unit 24, and operations corresponding to operation information obtaining unit 210 and selection unit 220 may be carried out by different programs. Alternatively, the operations may be carried out by different hardware resources.

What is claimed is:

1. An information-processing device comprising:
a display control means for causing a display means to display plural windows in an arrangement;
a selection means for selecting a window displayed on the display means; a switching means for switching a window being selected by the selection means from a first window to a second window, the second window being displayed in one of directions relative to the first window, the direction being indicated by an operation; and
a receiving means for receiving an instruction to change an arrangement of windows on the display means, wherein the display control means, in a case where an instruction is received by the receiving means, changes the arrangement of the plural windows so that a relative positional relationship changes between a selected window that is selected by the selection means and a non-selected window that is not being selected by the selection means,
an identifying means for identifying a relevance level for each pair of the plural windows, wherein the display control means changes the arrangement of the plural windows in accordance with a condition that a non-selected window that is not selected by the selection means, which is located adjacent to the selected window before the change of the arrangement is made is not adjacent to the selected window that is selected by the selection means after the change of the arrangement is made,
wherein the display control means changes the arrangement of the plural windows in accordance with a condition that a non-selected window that is not selected by the selection means, which is located within a range selectable from a position of the selected window by number n before the change of the arrangement is made, is relocated such that, the non-selected window is not within a range selectable from a position of the selected window by number n, which is smaller than number m, after the change of the arrangement is made, wherein the display control means changes the arrangement of the plural widows so that the selected window is able to be switched to a window having a higher relevance level relative to the selected window by the switching means in a smaller number of switchings.

2. An information-processing device according to claim 1, wherein:
the number of directions is predetermined; and the display control means determines a center window, and changes the arrangement of the plural windows so that a window exists in each of the predetermined number of directions relative to the center window.

3. An information-processing device according to claim 2, wherein the center window is the selected window.

4. An information-processing device according to claim 2, comprising identifying means for identifying a priority level for usage of each of the plural windows, wherein the display control means determines a window having a higher priority level to be the center window.

5. An information-processing device according to claim 4, wherein a priority level for usage of each of the plural windows is determined based on a time spent using an application corresponding to the window or a frequency with which the application is used.

6. An information-processing device according to claim 1, comprising a storage means for storing data on arrangements, wherein the display control means changes the arrangement of the plural windows on the basis of information stored in the storage means.

7. An information-processing device according to claim 6, wherein the display control means causes the display means to display the data on arrangements to receive an input by a user to select an arrangement, and changes the arrangement of the plural windows to the selected arrangement.

8. An information-processing device according to claim 1, wherein the display control means, in a case where the selected window extends beyond a predetermined display area of the display means, moves display positions of the plural windows so that the selected window does not extend beyond the predetermined display area, without changing the arrangement of the plural windows.

9. An information-processing device according to claim 1, wherein the information-processing device is a mobile phone.

10. An information-processing device according to claim 1, wherein when changing the arrangement of the plural windows, the display control means changes a position of the non-selected window, and does not change a position of the selected window that is selected before the change of the arrangement is made.

11. An information-processing device according to claim 1, wherein a relevance level for each pair of the plural windows is determined based on a time for which applications corresponding to a pair of applications are simultaneously used or a frequency with which the applications are simultaneously used.

12. A computer program product comprising instructions on a non-transitory computer medium, the computer program product causing a computer to execute the steps of:
causing a display means to display plural windows in an arrangement;
selecting a window displayed on the display means;
switching the window that is selected to another window, the other window being displayed in a direction relative to the window, the direction being indicated by an operation;
receiving an instruction to change an arrangement of windows on the display means;
in response to the instruction, changing the arrangement of the plural windows so that a relative positional relationship changes between the selected window that is being selected and a non-selected window that is not being selected;
identifying a relevance level for each pair of the plural windows; and
changing the arrangement of the plural windows in accordance with a condition that a non-selected window that is not being selected, which is located adjacent to the selected window before the change of the arrangement is made is not adjacent to the selected window that is being selected after the change of the arrangement is made, wherein the display means changes the arrangement of the plural windows in accordance with a condition that a non-selected window that is not selected, which is located within a range selectable from a position of the selected window by number n before the change of the arrangement is made, is relocated such that, the non-selected window is not within a range selectable from a position of the selected window by number n, which is smaller than number m, after the change of the arrangement is made, wherein the display means changes the arrangement of the plural widows so that the selected window is able to be switched to a window having a higher relevance level relative to the selected window in a smaller number of switchings.

13. An information-processing device comprising:
a display control means for causing a display means to display plural windows in an arrangement;
a selection means for selecting a window displayed on the display means;
a switching means for switching a window being selected by the selection means from a first window to a second window, the second window being displayed in one of directions relative to the first window, the direction being indicated by an operation; and
a receiving means for receiving an instruction to change an arrangement of windows on the display means, wherein the display control means, in a case where an instruction is received by the receiving means,
changes the arrangement of the plural windows so that a relative positional relationship changes between a selected window that is selected by the selection means and a non-selected window that is not selected by the selection means,
wherein the display control means changes the arrangement of the plural windows in accordance with a condition that a non-selected window that is not selected by the selection means, which is located adjacent to the selected window before the change of the arrangement is made is not adjacent to the selected window that is selected by the selection means after the change of the arrangement is made,
wherein the display control means, in a case where the selected window extends beyond a predetermined display area of the display means, moves display positions of the plural windows so that the selected window does not extend beyond the predetermined display area, without changing the arrangement of the plural windows,
wherein the display control means changes the arrangement of the plural windows in accordance with a condition that a non-selected window that is not selected by the selection means, which is located within a range selectable from a position of the selected window by number m before the change of the arrangement is made, is relocated such that the non-selected window is not within a range selectable from a position of the selected window by number n, which is smaller than number m, after the change of the arrangement is made.

14. A computer program product comprising instructions on a non-transitory computer medium, the computer program product causing a computer to execute the steps of:
causing a display means to display plural windows in an arrangement;
selecting a window displayed on the display means;
switching the window that is selected to another window, the other window being displayed in a direction relative to the window, the direction being indicated by an operation; and
receiving an instruction to change an arrangement of windows on the display means;
in response to the instruction, changing the arrangement of the plural windows so that a relative positional relationship changes between the selected window that is selected and a non-selected window that is not selected; and
changing the arrangement of the plural windows in accordance with a condition that a non-selected window that is not selected, which is located adjacent to the selected window before the change of the arrangement is made is not adjacent to the selected window that is selected after the change of the arrangement is made,
wherein the display means, in a case where the selected window extends beyond a predetermined display area of the display means, moves display positions of the plural windows so that the selected window does not extend beyond the predetermined display area, without changing the arrangement of the plural windows,
wherein the display means changes the arrangement of the plural windows in accordance with a condition that a non-selected window that is not selected, which is located within a range selectable from a position of the selected window by number m before the change of the arrangement is made, is relocated such that the non-selected window is not within a range selectable from a position of the selected window by number n, which is smaller than number m, after the change of the arrangement is made.

* * * * *